Sept. 6, 1966  E. CENITCH ET AL  3,270,566
INERTIAL SENSOR
Filed May 31, 1962  3 Sheets-Sheet 1
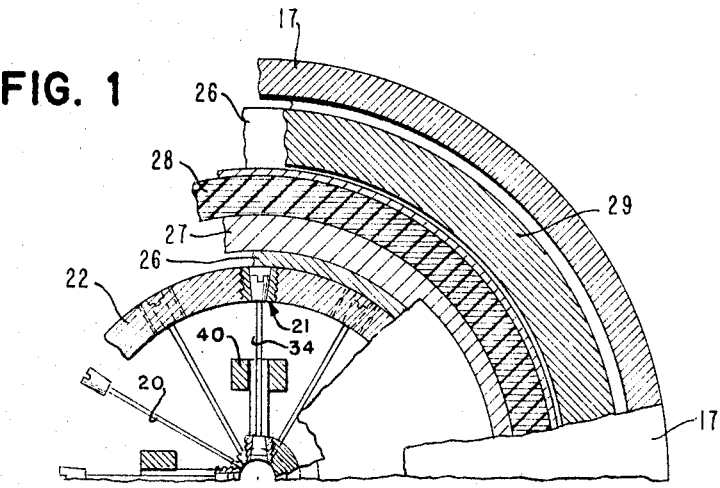
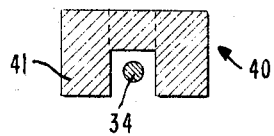
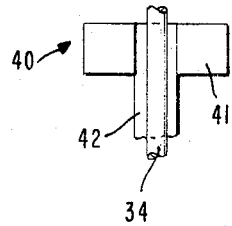
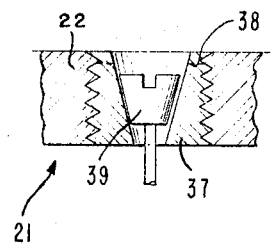
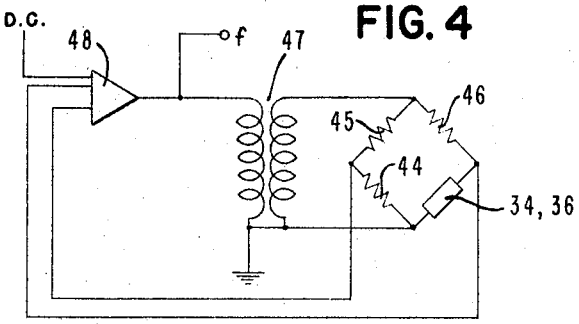
INVENTORS
EUGENE CENITCH
JOHN E. LUNDBERG
ROBERT A. WATSON
BY
ATTORNEY United States Patent Office 3,270,566
Patented Sept. 6, 1966

3,270,566
INERTIAL SENSOR
Eugene Cenitch and John E. Lundberg, Endwell, and Robert A. Watson, Endicott, N.Y., assignors to International Business Machines Corporation, New York, N.Y., a corporation of New York
Filed May 31, 1962, Ser. No. 198,912
14 Claims. (Cl. 74—5.6)

The present invention relates generally to gyroscopes and more particularly to an inertial sensor for use with such gyroscopes.

Conventional gyroscopic devices establish a fixed reference frame in space coincident with that of a spinning rotor. Any change in position of the supporting assembly carrying the gyroscope, such as a vehicle for example, exerts a force or torque on the device. The magnitude and direction of such forces indicates the character of the change in position effected upon the supporting structure.

Force measurements of this type are made by devices conventionally termed pick-offs, and it is this area of inertial sensing that is of primary concern here.

The most frequently encountered present known pick-off devices operate on the principle of magnetic induction where the gyroscopic device carried within a gimbal has magnetic parts which when moved past externally supported magnetic elements induce electric signals therein the magnitude of which is indicative of inertial change.

Another more direct approach to motion sensing adopted in certain accelerometers is that of using the inertial reaction of mass to acceleration itself for indicating the degree of acceleration. In brief, a mass is supported by a taut member arranged along the direction of motion of the mass and which member is set into a vibration mode. Changes in acceleration of the mass vary the amount of tension in such members and effect a corresponding change in the frequency of vibration. Monitoring the frequency of vibration provides an indication of the acceleration condition of the mass. It is upon this theoretical foundation that the gyroscopic device of the present invention resides, and, in particular, in extending this technique to indicate changes in position of such a device or, more to the point, the structure carrying the device.

It is therefore an object of the invention to provide a gyroscopic device having multidirectionally arranged inertial sensors for indicating changes in position in these various directions.

A further object is the provision of such a device in which the sensors are comprised of vibrating elements.

A still further object of the invention is the provision of such a device having a plurality of vibrating elements arranged respectively coincident with the directions of its degrees of freedom for sensing changes in acceleration of the device along any of the different preferred directions of freedom.

Another object of the invention is the provision of such a device having a plurality of vibrating inertial sensors in which the individual indications of the sensors are consolidated to form a single vectorial representation of the system acceleration.

Yet a further object is the provision of such a device where digital representations are made available corresponding to sensed acceleration changes.

Briefly, the gyroscopic device described herein is comprised of a spinning rotor contained within a support assembly. Certain support elements for the spinning rotor assembly are placed under tension and set into vibration at a rate consonant with the physical dimensions of the elements and the magnitude of the tensile force. Frequency discriminating means are provided for continuously determining the frequency of vibration of these support elements and any change from the imposed initial rate. Rendering of the noted changes of frequency from the initial mode defines the quantitative nature and direction of the external perturbing forces giving rise to the vibration rate change.

The foregoing and other objects, features and advantages of the invention will be apparent from the following more particular description of preferred embodiments of the invention, as illustrated in the accompanying drawings.

In the drawings:

FIGURE 1 is a perspective view partially in section of one form of the invention;

FIGURE 4 is a schematic functional block representation of electrical circuitry associated with the gyroscopic device;

FIGURES 5a and b illustrate the plan and elevation views, respectively, of one part of the device of FIGURE 1;

FIGURE 6 shows a special fitting for use with the invention; and

Figure 7:
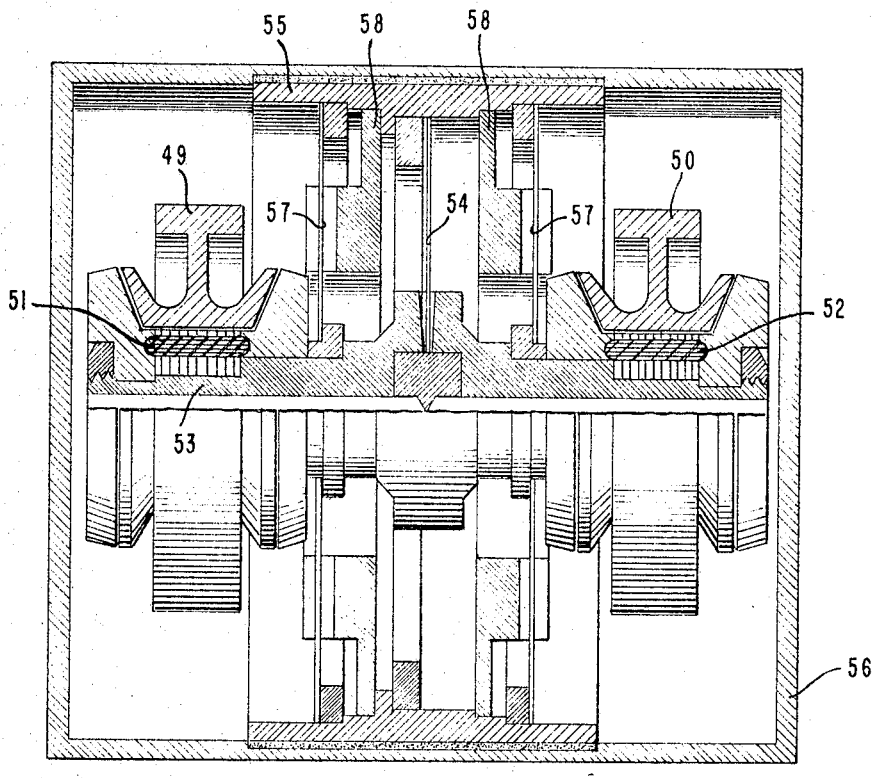

FIGURE 7 is another embodiment of the invention having a split mass rotor.

An understanding of certain theoretical aspects upon which the operation of the invention depends is believed essential for a full comprehension of the invention and its advantages. It is basic here that information relating to positional changes is achieved by noting the rate of change in vibration of a member which has been set in a particular mode of vibration of constant frequency.

Assume a vibratable member or filament is provided with an impulsing force tending to set it into vibration. The fundamental frequency of vibration of this member is defined mathematically by the following equation:

$$f = \frac{\pi}{2L^2}\sqrt{\frac{EIg}{xA}\left[1 + \frac{SL^2}{EI\pi^2}\right]}$$

where:

$E$=Young's modulus of the member
$I$=moment of inertia
$g$=gravitational acceleration constant
$x$=weight of the member per unit volume
$A$=cross sectional area of the member
$S$=tensile force
$L$=length of the member.

On maintaining a given vibrating member in a state of constant tension (S) the fundamental frequency of vibration is determined by the physical characteristics of the member alone. It follows therefore that for a member of defined characteristics with a known value of S initially, subsequent changes in the frequency of vibration of the member are attributable solely to corresponding changes in the tensile force, S, of the member. This functional relationship of the frequency of vibration of a member to accelerations of the member is exploited by the gyroscopic device described herein to provide an accurate indication of the character of these accelerations, and thus the associated changes in attitude of a supporting structure or craft.

Figure 3:
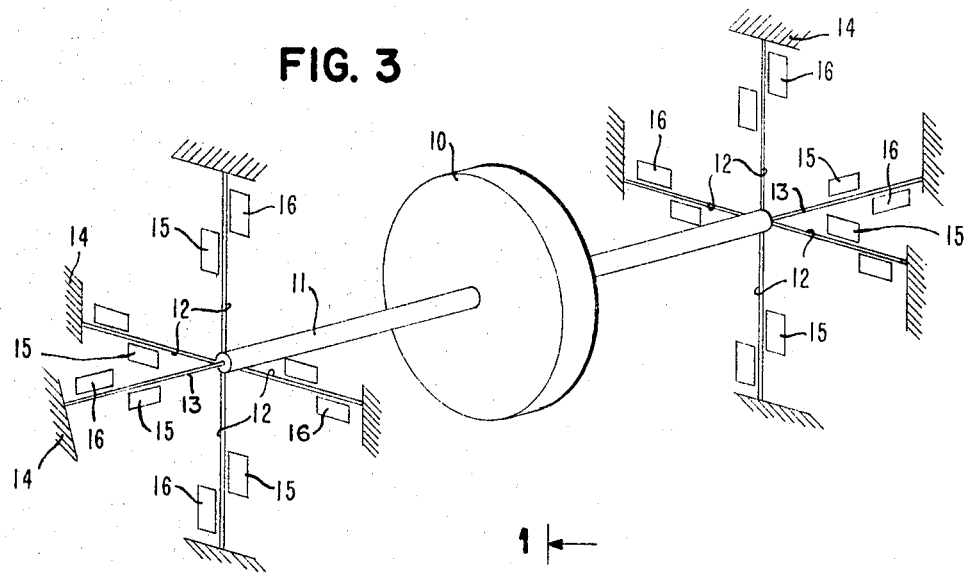
FIGURE 3 is a functional diagram illustrating the major elements of the described device in generalized form.

Turning now to FIGURE 3, there is shown in generalized representation, what is termed a three-axis accelerometer and two degree of freedom gyro. In the main, the gyro includes a rotor 10 mounted for rotation about a shaft 11, each extremity of which shaft is supported by four vibratable members 12 arranged mutually orthogonal and in planes disposed at right angles to the shaft. Additional vibratable members 13 are fixed to the ends of and extend substantially collinearly with the shaft. The other ends of the members 12 and 13 are secured to a base or other fixed reference member 14. Each of the vibratable members is initially set to some predetermined value of tensile stress compatible with the physical dimensions of the members and the modulus of elasticity of the material composing the members so that a permanent deformation does not result from normal use.

Individual driving means 15 are provided for each member 12 and 13 to set them in a mode of vibration which is constant during periods of unchanging tensile stress. For operation at the fundamental frequency of each member the associated driving means is operatively related to the member at its midpoint. Without concern for details, the driving means can be an electromagnet energized by an alternating voltage to provide an alternating field which interacts with a fixed field established in the associated member to produce a cyclic perturbation of the member.

Also, individual frequency sensing means 16 are linked to the members for continuously monitoring their frequency of vibration. Exemplary of one such a suitable device would be a U-shaped magnetic core provided with an associated sense winding. The member would be disposed between the legs of the core and arranged so that its direction of vibration would be transverse of the lines of flux established between the core legs. With a fixed magnetic field established about the member, achieved by passing a direct current through the member for example, vibration of the member in the prescribed direction induces a voltage in the sense winding of the frequency sensing means. Mathematically the value of this induced voltage is represented by the following equation:

$$e = 10^{-8} N \frac{d\phi}{dt}$$

where:

$N$ = number of turns on the sense winding
$d\phi/dt$ = rate of change of the magnetic flux.

The voltage induced in the sense windings has the same periodicity as the vibrating member, and accordingly can be directly utilized to monitor the vibrating frequency of the member.

Figure 2:
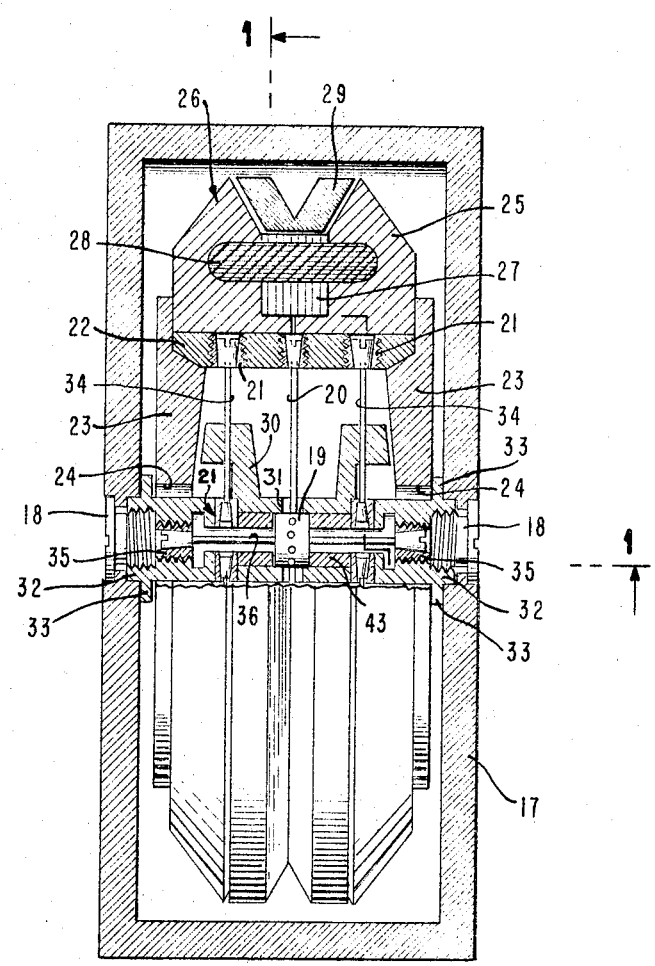
FIGURE 2 is an elevation sectional view of the device of FIGURE 1.

Turning now to the detailed structure of one form of the invention reference should be made specifically to FIGURES 1 and 2. All moving parts are mounted in a single-chamber enclosure 17 by a pair of members 18 each having threaded extremities and an enlarged head portion that is engagingly received in recessed openings provided in the enclosure when the threaded portions are received therethrough for engagement with suitably formed parts of the gyro proper. A thick disc-like support hub 19 is provided with a plurality of equi-length radially extending support rods 20 secured to the curved surface of the hub thereby forming a web of generally spoked-wheel appearance. In a way that will be shown later, the outer ends of the rods 20 are connected to other portions of the gyro in such manner as to support the bulk of the gyro weight.

Further in this regard, it is the basic purpose of the hub 19 and its associated rods 20 to support the greater part of the total weight of the gyro, yet leaving a certain portion of this weight effectively influencing the as yet undescribed structures having the same functional properties as the elements 12 and 13. To accomplish this purpose a material must be used for the rods 20 which has good load bearing ability, is flexible and preferably non-magnetic to obviate undesirable interaction with the vibrating members. Although several materials are believed fully satisfactory for this use, such as beryllium-copper and titanium alloys, the best material known at this time is quartz.

The outer extremities of the rods 20 terminate in special fittings 21 carried by an annular mounting base 22, the fittings being received in suitably prepared openings arranged in a path medial the edges of the base. A pair of disc-like support covers 23 are supplied with shoulders for being fittingly received over the edges of the base 22 and secured in this position. Axially located openings, indicated generally at 24, in the covers 23 serve as means of access to the other parts of the novel gyro to be described below.

A motor base structure 25 is received on the outer surface of the annular mounting base and clampingly held by the peripheral reaches of the support covers. This structure extends completely around the mounting base, and includes an outwardly directed channel of a generally wedge-shaped cross section the outermost portion of which is wider than the inner portions. The channel is formed into a circular path concentric to and co-planar with the wheel-like structure formed by the rods 20 and the hub 19. Thus, the base structure 25 acts as a shaft about which the rotor rotates.

Included within the motor base structure 25 are driving means 26 comprised of a magnetic core 27 and three-phase windings 28 (external electrical connections not shown) forming, in effect, a synchronous motor. As shown best in FIGURE 2 the actuating portions of the core 27 form portions of the floor of the channel.

A rotor 29 is constructed of such dimensions relative to those of the channel in which it is received, but differing slightly, so that when it rotates along the channel it is supported by a film, or cushion, of air. In a way well-known in the art, appropriate energization of the driving means 26 causes the rotor to rotate in the channel at a substantially constant rate of speed.

Rotation of the rotor 29 serves the same function in the present gyro as the rotor 10 of the generalized device in FIGURE 3. This selection of a gas bearing for support of the rotor is not mere choice, but rather based upon certain properties provided by this type of bearing which are essential to satisfactory operation of an inertial sensing device depending upon the vibration rates of a vibratable member. Thus, as will be more evident, because of the exceptional sensitivity of the invention it can be influenced by the extremely small amounts of noise that would be contributed if even high grade conventional ball bearing races were used to support the rotor. Accordingly, not only is a gas bearing desirable for its low rolling friction property, but also because it provides exceptionally low levels of mechanical vibrations, or noise.

Extending away from each of the major flat surfaces of the hub 19 is a generally tube-like referencing base 30. The inner end of each such base has a shoulder 31 for receiving the hub 19 in a close fitting relationship. The outwardly directed extremity of each base has portions removed leaving four finger-like projections 32 of such dimensions and relative location that when fully mounted they extend through correspondingly located openings in the covers 23. Slightly inwardly of the outermost extremities of each projection is a shoulder 33 for abutting against the inner wall portions of the enclosure immediately adjacent the openings when the extremity of the projection is received therein. Also, the inner surfaces of the outer ends of the projections are appropriately threaded to receive the members 18.

Four openings in the base 30 arranged in a plane normal to the long dimension of the base and disposed ninety degrees apart are provided for receiving fittings such as the fittings 21. Directly opposite these fittings are complementary fittings carried by the annular mounting base 22. These corresponding pairs of fittings serve as anchoring means for special vibratable members 34. Accordingly, as shown best in FIGURE 1, there are two sets of four such vibratable members each, with the members of each set mutually orthogonal.

Moreover, at the central portion of each major surface of the hub 19 (not shown) there is provided a fitting of this same general type and complementary fittings 35 mounted on the inner surface of that portion of the enclosure wall disposed between the openings therein. A single vibratable member 36 is mounted between each of these complementary fittings providing two such members disposed at ninety degrees to the two sets of four such members described in the preceding paragraph. The members 34 correspond functionally to the members 12 of FIGURE 3, whereas the members 36 are the equivalent of the members 13.

The materials used for constructing the members 34, 36 must possess certain very specific characteristics. A most important requisite property is that of low "creep," that is, slight elongation when subjected to sustained tensile loadings. For most materials this phenomenon occurs even where the loadings do not exceed the elastic limit of the member. Also, the material must have a sufficiently good tensile strength to provide a member which can be vibrated with low power driving and serve its other functions. A further important quality is that of low hysteresis to keep driving power requirements correspondingly low. The best known material for this purpose is quartz which has excellent properties in all the above-noted respects.

Specifically as to structural aspects of the members 34, 36 they are formed by drawing quartz into a fiber form while directing an intensely hot flame onto it. This insures that no small cracks, or fissures, are created in thé fibers that would weaken them causing either outright failure of the member or erratic operation. For a purpose that will be clearer later, the fiber is provided with an electrically conductive film or coating on its surface, formed by plating or the like.

Other excellent materials for the vibratable members are titanium-aluminum alloys or beryllium-copper alloys. Here, the member would be most advantageously formed into a generally ribbon-shape of relatively thin cross section.

The fittings 21 and 35 for anchoring the vibratable members and the support rods 20 are adjustable to allow setting tension to a prescribed value. Specifically, the fitting includes a body portion 37 (FIGURE 6) having external screw threads and a conical bore extending completely through. A slot 38 is provided in the body portion for use in adjustment of the body portion along a similarly threaded opening in which it is received. Thus, translation of the body portion results in an identical movement of the conical head 39 that serves as termination for members 34, 36 or rods 20 carried within the conical bore thereby increasing or decreasing the tensile stress in the associated vibratable member or rod dependent upon the direction of translation of the body portion.

Referring now to FIGURES 5a and b, there is illustrated a magnetic drive means 40 in operative relation to a vibratable member 34. Each one comprises a U-shaped permanent magnet 41 mounted atop a pedestal 42. Comparing these views with FIGURE 2, it is seen that the pedestal of each means 40 is secured to the base 30 at such location that the legs of the magnet 41 are in surrounding relation to its associated member 34. There are a total of eight such magnet assemblies, one for each of the members 34.

A similar driving means for each of the members 36 consists simply of a U-shaped permanent magnet 43 secured to the inner surface of the referencing base 30. In FIGURE 2 these magnets are illustrated as seen looking into the ends of the legs of the magnets.

As noted in the theoretical discussion, vibration of a vibratable member is effected by interaction of an external magnetic field and a magnetic field associated with the member. Specially here, the external field is provided by the means 40, 43 and the field associated with the member is obtained by passing an electric current through the member, or via the metalized coating carried by the quartz member. As shown in FIGURE 4, each member 34, 36 is electrically related in a bridge circuit with resistances 44–46. A transformer 47 has its secondary wired across the common point of resistances 45, 46 and the common point of resistance 44 and the member 34, 36, with the latter point also held at ground potential.

A difference amplifier 48 is provided with two inputs from the common point of resistances 44, 45 and the common point of the member 34, 36 and resistance 46. The output of the amplifier serves as a driving means for the primary of the transformer 47 and also for a point at which the frequency of vibration of the member 34, 36 is monitored in the given circuit (indicated at $f$).

As to specific circuit parameters, the following are satisfactory representative values:

Transformer 47—turns ratio of about 20:1
Resistances 44 and 46—about 10× the D.C. resistance of the vibrating member
Resistance 45—approximately 100× the D.C. resistance of the vibrating member.

With the vibratable member vibrating at its fundamental rate a certain fixed amount of difference voltage is presented to the amplifier 48, the output of which alternates at the same rate as that of the fundamental frequency of vibration. Changes in tensile stress of the member effect corresponding changes in its rate of vibration thereby changing the voltage frequency, $f$, of the amplifier 48.

The resistances 44–46 are of such values as to insure that throughout the expected range of operation the bridge circuit remains in a state of imbalance, and current flow is sustained through the member 34, 36. This is essential since without such current flow there is no magnetic field associated with the member, and, accordingly, the member would cease vibrating. Here, this imbalance is maintained by the fact that the resistance 45 is of the order of 100× the resistance of the vibrating member, which is considerably remote from a balanced-bridge condition.

Processing of the different frequencies ($f$) for interpretation as to the causative reorientation of the gyro device is contemplated as being accomplished by a digital computer, the exact features of which are not considered necessary for a full understanding of the invention. It is sufficient to note in this regard that such a determination, or computation, is well within the present capabilities of the digital computing art.

Another embodiment which offers exceptional advantages particularly in regard to sensitivity is that shown in FIGURE 7. It comprises, in the main, two rotors 49 and 50 with associated respective drive means 51 and 52 disposed on a common elongated support assembly 53, one set at each end thereof. A support means 54 consisting of a plurality of rods arranged to form a spoked-wheel structure, such as that in the previously described embodiment, is disposed midway between the two rotor sets for mounting the same to an annular support 55. This support, in turn, is secured to an enclosure 56 for mounting the entire apparatus in a vehicle, for example, or other structure.

As before, vibratable elements 57 are arranged in two sets of four each, with each vibratable element disposed at ninety degrees to adjacent members of its set. The sets of elements are located, respectively, between the support means 54 and the individual sets of rotor driving means. Each of the elements is connected between the support assembly 53 and the annular support 55 and placed in a state of tension. Magnetic drive means 58 are provided for inducing vibrations in the vibratable elements, and additional circuitry of the type previously described monitors changes in frequency experienced by the elements when the assembly is subjected to linear and/or angular accelerations.

Distributing the mass of the rotor into two separate parts and locating the vibratable members therebetween permits a closer spatial relation of these members which increases overall sensitivity due to the shortened moment arm of the members as measured from the system axis of rotation. Also, the center of mass and center of suspension are the same eliminating a possible source of error.

In accordance with the practice of the present invention there is provided a combination accelerometer and gyroscope which is highly sensitive to externally applied turning rates and accelerations which may occur in either (or both) of two axes. A navigation system normally requires measurements along three orthogonal axes which can be provided by two devices of the type set forth herein. If a third such device is used complete redundancy is obtainable.

An important advantage of the apparatus described is the elimination of torquers which are customary in many types of state of the art gyros. A further advantage is the elimination of flotation fluids which are undesirable not only because they require leak-proof enclosures but also because they have poor resistance to radiation.

A still further advantage over present state of the art devices is the direct supplying of information relative to turning rates and accelerations in digital form, rather than the usual analog signals. In explanation, the alternating voltage, $f$, is immediately translatable to digital form where the rate of oscillation is expressed by a numerical count of the voltage peaks (or nodes).

While the invention has been particularly shown and described with reference to preferred embodiments thereof, it will be understood by those skilled in the art that the foregoing and other changes in form and details may be made therein without departing from the spirit and scope of the invention.

What is claimed is:
1. A gyroscopic device, comprising:
a rotor mounted for rotation about a shaft;
vibratable stressed members attached to said shaft, and extending outwardly thereof;
base reference means connected to the outer ends of said members;
drive means for maintaining the members in a vibrating state; and
means operatively related to said vibratable members for sensing and indicating the frequency of vibration of said members whereby the changes in frequency of vibration noted serve to identify corresponding changed force conditions externally imposed upon said base reference means.

2. A gyroscopic device as in claim 1, further comprising:
gas bearing means relating the rotor to the shaft.

3. A gyroscopic device as in claim 1, in which said rotor consists of multiple rotating parts and the vibratable members are disposed intermediate said rotating parts.

4. A combination two-degree gyro and three-degree accelerometer, comprising:
a shaft;
a heavy mass rotor carried by said shaft for rotation thereon;
drive means associated with said rotor for rotating the same about said shaft as an axis;
a reference base;
a plurality of transverse sensing members interrelating the shaft and base and maintained in a predetermined state of tension;
second stressed sensing members connected to the extremities of said shaft extending outwardly and substantially collinearly therewith and secured to said base;
drive means for setting said first and second members into a sustained mode of vibration;
sensing means associated with each of said members for determining the individual frequencies of vibration of said members; and
means for correlating the different frequencies sensed to determine the corresponding change in orientation of the reference base effecting the frequency change of the members.

5. An inertial reference apparatus, comprising:
a heavy mass rotor mounted for rotation on a shaft;
drive means associated with said shaft movably securing the shaft and rotor in a predetermined positional relationship to a reference base when in an acceleration-free condition;
a plurality of vibratable members relating the shaft to the reference base such that externally applied accelerations effect a redistribution of forces within said members;
means for setting the vibratable members into a state of vibration where the rate of vibration is dependent upon instantaneous conditions of tensile stress of said members; and
rendering means for continuously noting the individual frequencies of the different members and providing information signals as to the vectorial character of the externally applied accelerations.

6. An inertial reference apparatus as in claim 5, in which the vibratable members consist of individual quartz filaments.

7. An inertial reference apparatus as in claim 5, in which the vibratable members include two sets of four members each, each of said sets being associated with one end position of the shaft and the individual members of each set forming an orthogonal set.

8. An inertial reference apparatus as in claim 5, in which the vibratable members have respective rod-like configurations extending radially from the shaft and secured to the reference base such that in the absence of external accelerations the vibratable members are in a substantially equally stressed condition.

9. An inertial sensing device for use with a gyroscope having a mass rotating on a shaft, comprising:
taut vibratable members arranged between said shaft and a reference base;
permanent magnet means arranged to direct a magnetic field transversely said members;
electric current source means operatively connected to said members for passing current therethrough whereby interaction of the field produced by the current with the permanent magnet field causes movement of the members relative to the permanent magnet means; and
circuit means interrelated with said current source means and said vibratable members for producing an alternating current having a frequency identical to the frequency of vibration of said member, a part of which alternating voltage is fed back through the member for sustaining vibration of said member.

10. An inertial sensing device as in claim 9, in which means are carried by said vibratable members for selectively adjusting the tension in said members to a predetermined value.

11. An inertial sensing device as in claim 9, in which said members consist of flame-drawn quartz having electrically conductive coatings on the outer surface for carrying the alternating current.

12. An inertial sensing device as in claim 9, in which said members are constructed of beryllium-copper.

13. An inertial sensing device as in claim 9, in which said vibratable members consist of ribbonlike elements of a titanium-aluminum alloy and are located in the permanent magnetic field such as to vibrate in a direction across the thin dimension of said elements.

14. An inertial sensing device as in claim 9, in which said circuit means comprises an unbalanced four-part bridge circuit including the vibratable member as one leg, transformer means having its secondary connected across two common points of the bridge, differential amplifier means having its input connected across the two remaining common points of the bridge and its output driving the primary of the transformer whereby the electrical signal arriving at the output of the amplifying means has the same frequency as the rate of vibration of the included vibratable member.

References Cited by the Examiner

UNITED STATES PATENTS

| | | | |
|---|---|---|---|
| 2,746,301 | 5/1956 | Henderson | 74—5.6 |
| 2,852,943 | 9/1958 | Sedgfield | 74—5.7 |
| 2,878,006 | 3/1959 | Sedgfield et al. | 74—5.6 X |
| 2,947,178 | 8/1960 | Adams | 74—5.7 |
| 2,968,950 | 1/1961 | Dunbar et al. | 73—510 |

FOREIGN PATENTS 138,081   7/1950   Australia.

FRED C. MATTERN, JR., *Primary Examiner.*

BROUGHTON G. DURHAM, *Examiner.*

T. W. SHEAR, *Assistant Examiner.*